United States Patent [19]
Nakako et al.

[11] 3,792,842
[45] Feb. 19, 1974

[54] RECTIFYING TOWER

[75] Inventors: Yukio Nakako, Nishinomiya; Toshio Kanazawa; Akira Toyama, both of Kobe; Sumio Kiyokama, Akashi, all of Japan

[73] Assignee: Kobe Steel, Ltd., Kobe, Japan

[22] Filed: May 10, 1972

[21] Appl. No.: 251,978

[52] U.S. Cl.............. 261/148, 165/166, 261/112, 261/156
[51] Int. Cl............................................. B01f 3/04
[58] Field of Search .... 261/112, 148, 156; 165/105, 165/166; 202/158

[56] References Cited
UNITED STATES PATENTS

| | | | |
|---|---|---|---|
| 2,566,161 | 8/1951 | Brown, Jr. .................... | 165/166 X |
| 2,703,700 | 3/1955 | Simpelaar ...................... | 165/166 X |
| 3,282,334 | 11/1966 | Stahlheber ..................... | 165/166 |
| 3,568,462 | 3/1971 | Hoffman et al. .............. | 261/112 X |
| 3,612,494 | 10/1971 | Toyama et al. ................ | 261/112 |
| 3,669,186 | 6/1972 | Schauls ......................... | 165/166 |

*Primary Examiner*—Frank W. Lutter
*Assistant Examiner*—Richard L. Chiesa
*Attorney, Agent, or Firm*—Oblon, Fisher, Spivak, McClelland & Maier

[57] ABSTRACT

A rectifying tower having a laminate of rectifying elements filled with waved fins between vertical main partition plates in which each rectifying element has an auxiliary partition plate having a smaller area than that of the main partition plate which is partially disposed vertically between two opposite main partition plates in respective rectifying elements, a gas-liquid contacting chamber in the space formed between portions of two opposite main partition plates not having an auxiliary partition plate therebetween, a distribution chamber in the space formed between the auxiliary partition plate and one of the two main partition plates, and a heat transfer chamber in the space formed between the auxiliary partition plate and the other of the two main partition plates, having passage sealed from the gas-liquid contacting chamber and the distribution chamber. Thus, preferably rectifying operation of a wetted wall type tower is always conducted regardless of the amount of raw fluid involved.

15 Claims, 18 Drawing Figures

PATENTED FEB 19 1974

RECTIFYING TOWER

BACKGROUND OF THE INVENTION

Field Of The Invention

This invention relates to rectifying towers, and more particularly to a novel wetted wall type rectifying tower.

Conventional rectifying towers are generally classified into three systems, such as the tray tower, the packed tower and the wetted wall tower, according to the structural differences thereof. The tray tower system is the most widely employed for rectification, and the packed tower system is the next most widely used, while the wetted wall tower type is rarely used. The reason why the tray tower system is so widely used is that structurally a stable rectifying operation may be conducted with a great deal of treating material. In comparison, though the packed tower system may be stably operated under a condition such that the amount of liquid is, for example, relatively great, such as in a gas-absorbing operation, since a less amount of liquid is conducted in the rectification, a technical difficulty is caused to arise. In comparison with the tray tower system, the pressure loss is, however, small with simple structure and economy, and accordingly it is adopted. However, in the wetted wall tower system, the structure tends to become complicated due to the fact that a great deal of wetted wall surface must be formed within a unit volume, which also introduces some technical difficulties.

In addition, because it is difficult to uniformly distribute a relatively small amount of liquid over all of the wetted wall, similar to the case of the packed tower system, while the advantageous pressure loss is, for example, extremely small in comparison with the other two systems, it is extremely rare to adopt it, except in particular cases, as in vacuum distillation.

The present invention provides a wetted wall type rectifying tower having a novel constitution as a result of study of the aforementioned various types of rectifying towers, particularly of detailed discussion of the advantages and disadvantages of the wetted wall type rectifying tower and of improvements thereof.

SUMMARY OF THE INVENTION

It is, therefore, an object of the present invention to provide a rectifying tower which may uniformly distribute a small amount of liquid over all of the wetted wall for a horizontal sectional area of the gas-liquid contacting chamber.

It is another object of this invention to provide a rectifying tower which provides improved circulation of the fluid to be rectified in the tower and gives high mobility to the fluid.

It is still another object of this invention to provide a rectifying tower which may stably operate to separate the raw material into its gas and liquid components having high quality.

It is still another object of this invention to provide a rectifying tower having improved arrangements among the gas-liquid contacting chamber, distribution chambers and heat transfer chambers.

It is still another object of this invention to provide a rectifying tower having an effective structure for extracting gas and liquid from the gas-liquid contacting chamber.

According to one aspect of this invention, there is provided a rectifying tower having a laminate of rectifying elements filled with waved fins disposed between vertically oriented main partition plates which comprises an auxiliary partition plate having a smaller area than that of the main partition plate and being partially disposed vertically between two opposing main partition plates in the respective rectifying elements, a gas-liquid contacting chamber in a space formed between opposite main partition plates without an auxiliary partition plate, a distribution chamber formed in a space between an auxiliary partition plate and one of the two main partition plates, and a heat transfer chamber formed in a space between the auxiliary partition plate and the other of the two main partition plates having a sealed passage from the gas-liquid contacting chamber and the distribution chamber.

The essential part of this invention resides in a wetted wall type rectifying tower which has a laminate of rectifying elements comprising gas-liquid contacting chambers, distribution chambers, and heat transfer chambers. In the rectifying element, two layers consisting of both a distribution chamber and a heat transfer chamber correspond to one layer consisting of a gas-liquid contacting chamber, and both a distribution chamber and a heat transfer chamber form a heat exchanger which acts as a condenser or a reboiler in combination with a gas-liquid contacting chamber.

In the case where the heat exchanger formed by a distribution chamber and a heat transfer chamber is used as a condenser, it is installed in the upper part of the gas-liquid contacting chamber, and where the heat exchanger is used as a reboiler, it is installed in the lower part of the gas-liquid contacting chamber in the rectifying element.

BRIEF DESCRIPTION OF THE DRAWINGS

Various other objects, features and attendant advantages of this invention will be more fully appreciated as the same becomes better understood from the following detailed description when considered in conjunction with the accompanying drawings, in which like reference characters designate like or corresponding parts in the several FIGS. and wherein.

DESCRIPTION OF THE ILLUSTRATED EMBODIMENTS

Figures 1, 3:
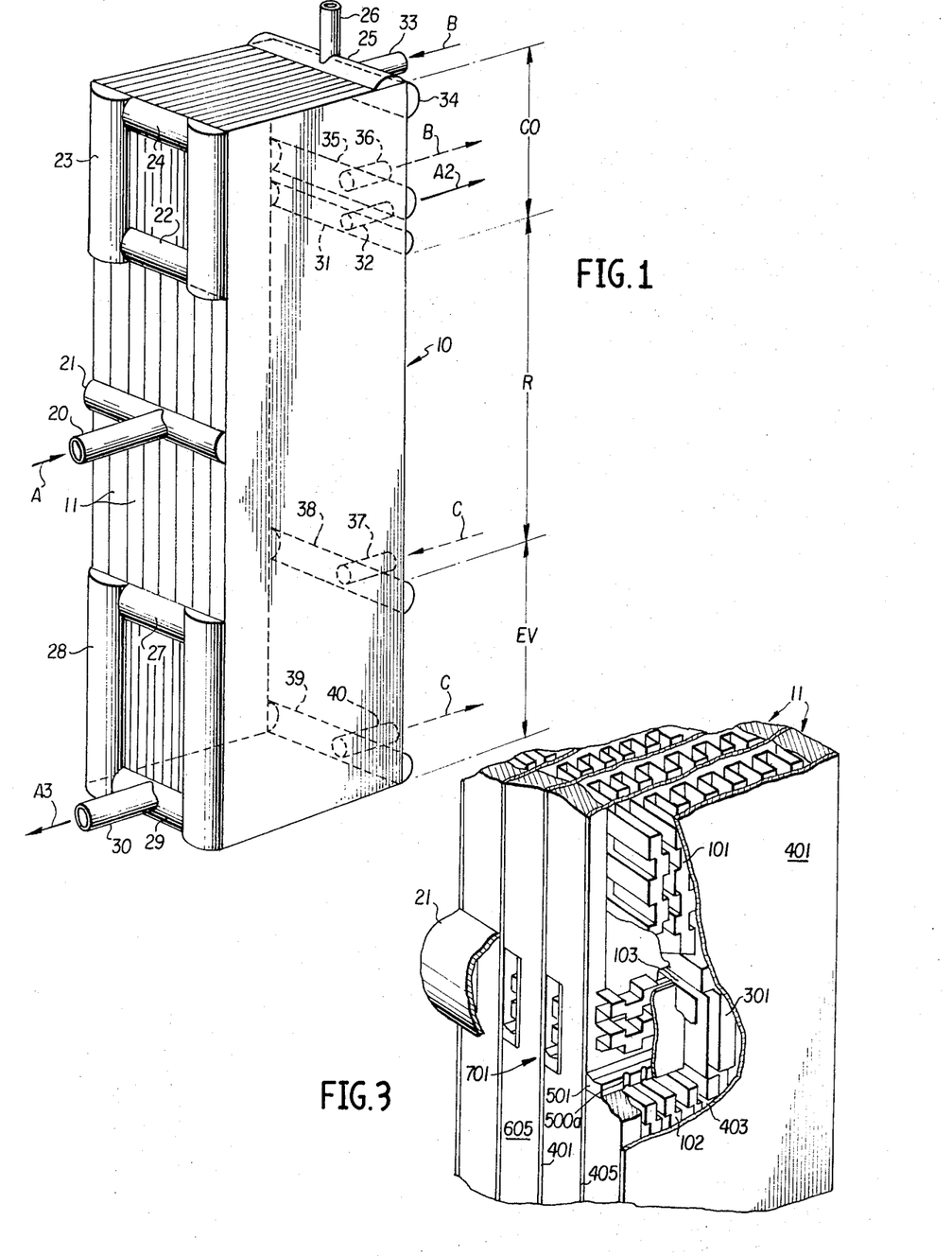
FIG. 1 is a schematic perspective view of the general appearance of a rectifying tower constructed according to this invention.
FIG. 3 is an enlarged perspective view of the interior structure of the center, or the raw material supply portion, of the tower of this invention.

Referring now to the drawings, and more particularly to FIG. 1, a rectifying tower 10 constructed according to this invention is shown having a condensing portion CO which corresponds to the upper portion of the rectifying elements and includes condensers consisting of distributing chambers and heat transfer chambers, a rectifying portion R which corresponds to the center portion of the rectifying elements and includes gas-liquid contacting chambers, and a reboiling portion EV which corresponds to the lower portion of the rectifying elements and includes reboilers consisting of distributing chambers and heat transfer chambers. A raw material supply pipe 20 connects with a raw material distributing pipe 21 along one edge of the rectifying portion R. A tower top horizontally disposed gas manifold pipe 22 is connected through vertical gas communicating pipes 23 to an upper horizontally disposed gas distributing pipe 24, while a vent manifold pipe 25 is connected to a vertical vent pipe 26 in the upper condensing portion CO. A tower bottom horizontally disposed liquid manifold pipe 27 connects through vertical liquid communicating pipes 28 to a lower horizontally disposed liquid manifold pipe 29 having a drain pipe 30 connected therewithin the lower reboiling portion EV. Also in the upper condensing portion CO, a tower top condensing manifold pipe 31 is shown connected to a condensed liquid drain pipe 32, and a cooling fluid inlet pipe 33 is connected to a cooling fluid distribution pipe 34. A cooling fluid manifold pipe 35 and a cooling fluid outlet pipe 36 are disposed in the condensing portion, and a heating fluid inlet pipe 37 connected with a heating fluid distributing pipe 38 and a heating fluid manifold pipe 39 connected to a heating fluid outlet pipe 40 are disposed in the lower reboiling portion.

As shown in FIG. 1, the rectifying tower body 10 has a structure of vertically oriented rectifying elements 11 laminated integrally in a plurality of layers, which elements 11 are integrally constructed from respective component members by soldering or the like as shown in FIGS. 5A to 5H. The waved fins used mainly for the rectifying elements 11 are generally classified as serrated or serpentine fins 100 and multihole plate fins 200, which may preferably be made of aluminum alloy sheet, such as shown in FIG. 8. The serrated or serpentine fins 100 have horizontally disposed portions 100a formed in a wavy configuration so that raised portions and recessed portions of predetermined width are provided in parallel relation in an elevational direction at equal distances defining the height of the fins in such a manner that the raised portions are positioned between the recessed portions in the advancing direction of the wave in an alternating manner so that zigzag passages 100b are formed between the respective raised portions 100a as shown in FIG. 8A. These passages 100b are disposed vertically or horizontally in the interior of the rectifying element 11, and the bent portions 100c of the fins are brazed to the respective partition plates which will be hereinafter described. In FIG. 8B, multi-hole plate fins 200 having raised portions 200a are formed in wavy configuration which means the height of the respective fins, and have a number of holes 200d arranged to be formed in the raised portion 200a so that zigzag passages 200b are formed vertically or horizontally in the interior of the rectifying elements 11 similar to the serrated fins 100, and the bent portions 200c of the fins are brazed to the respective partition plates. It was determined from the studies of the present inventors that when serrated fins 100 or multihole fins 200 are used in the rectifying portion R of the rectifying tower body 10, it is preferable that the heights of the raised portions are 8 to 20mm and the wave pitch of the fins are 1.5 to 6mm.

Figure 2:
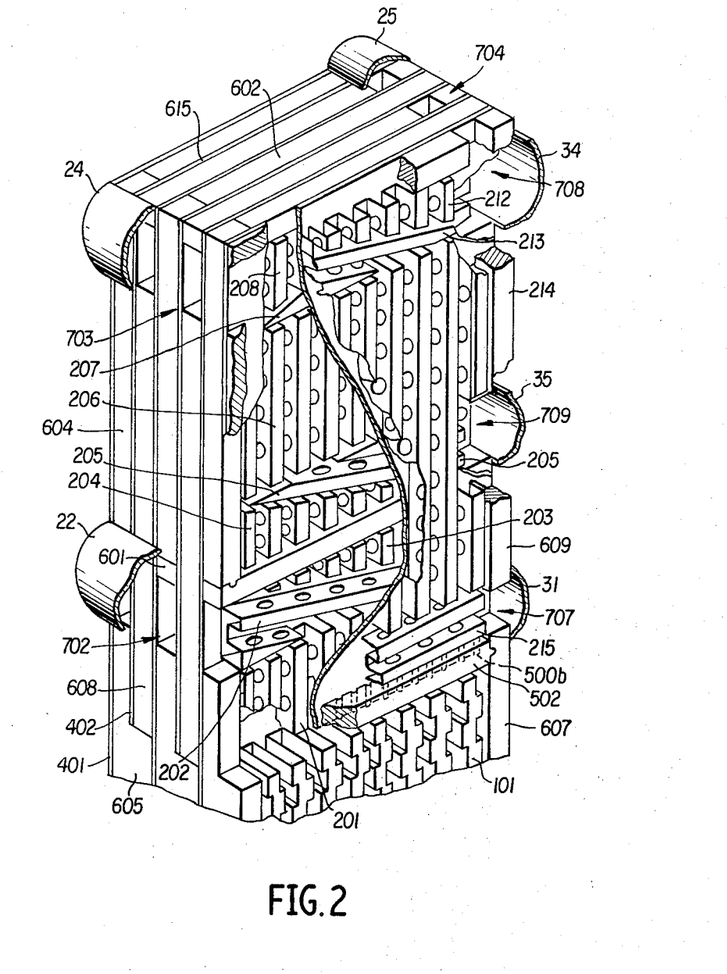
FIG. 2 is an enlarged perspective view of the interior structure of the upper portion, or the condensing portion, of the tower of this invention.
Figure 4:
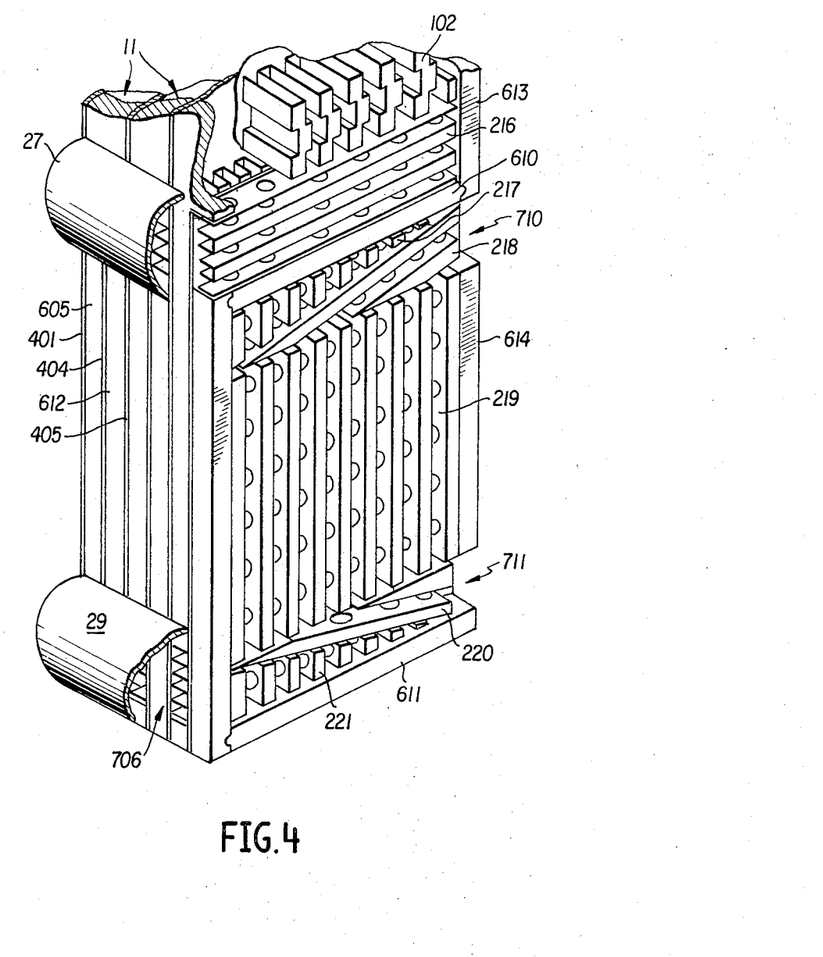
FIG. 4 is an enlarged perspective view of the interior structure of the lower, portion or the reboiling portion, of the tower of this invention.
Figure 5A:
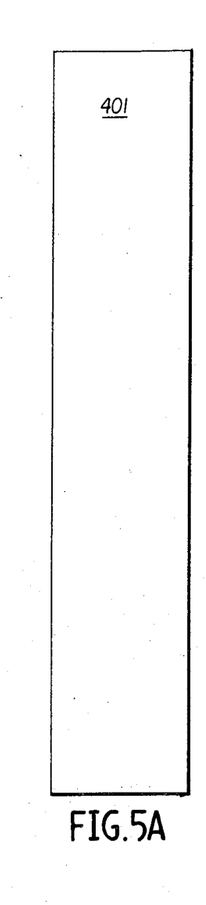
FIGS. 5A through 5I are front schematic views of the respective members constituting the rectifying elements and FIG. 5J is a left side schematic view of the rectifying elements.
Figure 5B:
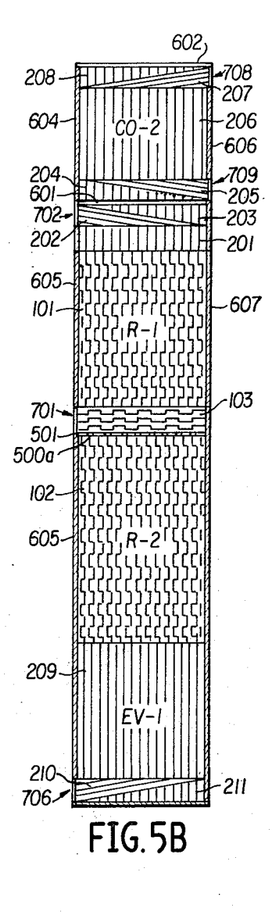

The rectifying elements 11 are made by laminating the respective component members shown in FIGS. 5A to 5H, and by brazing them into an integral form as was described, so that the upper, center and lower portions of the rectifying elements 11 are constructed to be as shown in FIGS. 2, 3 and 4 respectively. The respective members from the second and further layers of rectifying elements are so disposed as to partition completely the main partition plate 401 of the first layer and for partitioning the respective rectifying elements 11 in the rectifying tower body 10 generally into four vertically arranged portions, such as the condensing portion CO, an upper rectifying portion R–1, a lower rectifying portion R–2 and the reboiling portion EV. That is, as shown in FIG. 5B, the fins 101 and 102 are vertically disposed elevationally in such a manner that the respective passages 100b thereof are disposed vertically and that a predetermined width of the center portion thereof is rested against the partition plate 401. Fins 103 being approximately half as high as the fins 101 and preferably slightly less than half the height of the fins 101 by an amount equal to half the thickness of the partition plate, which hereinafter will be called approximately half, are disposed in such a manner between fins 101 and 102 that the passages thereof are disposed horizontally at the center portion. A liquid dispersing frame 501 having vertical grooves 500a formed therein within the range of one to 10 times the pitch width of the fins 101 in one side surface thereof, and also being of the same width as the height of the fins 103, is horizontally disposed between the lower ends of the fins 103 and the upper ends of the fins 102 so as to provide a raw material supply and a distributing portion for partitioning the upper rectifying portion R–1 and the lower rectifying portion R–2. Fins 201 having a height approximately half the height of the fins 101 are disposed above the fins 101 in such a manner that the passages thereof are vertically oriented, and fins 202 having the same height as that of the fins 201 are so disposed in the upper portion CO of the tower that the passages thereof are oriented obliquely in a downward direction as they become farther away from the outlet formed at one side of the main partition plate 401. Thereabove are disposed fins 203 being of the same height as the fins 201 and being arranged in such a manner that the passages thereof are disposed vertically, and above fins 203 is horizontally disposed a frame 601 having a width equal to the height of the fins 201 so as to completely partition off the heat transfer chamber or cooling fluid path CO–2. Above the frame 601, fins 204 having the same height as the fins 201 are disposed in such a manner that the passages thereof are vertically oriented, and thereabove fins 205 having the same height as the fins 201 are disposed in such a manner that the passages thereof extend obliquely in an upward direction as they get farther away from the outlet formed at the other side of the main partition plate 401. Disposed above fins 201 are fins 206 being of the same height as the fins 201 with the passages thereof being vertically oriented, and thereabove are fins 207 having the same height as that of the fins 201 being disposed in such a manner that the passages thereof are obliquely oriented in a downward direction as they become farther away from the inlet 24 formed at the other side of the main partition plate 401, and thereabove fins 208 having the same height as that of the fins 201 are disposed in such a manner that the passages thereof are vertically oriented. Above the fins 208, frame 602 having the same width as the height of the fins 201 is disposed at the upper end of the main partition plate 401.

Fins 209 having the same height as that of the fins 201 are disposed below the fins 102 in such a manner that the passages thereof are oriented vertically, and therebelow, fins 210 having the same height as the fins 201 are so disposed that the passages thereof are obliquely oriented in an upward direction as they become farther from the outlet formed at one side of the main partition plate 401. Below the fins 210 are fins 211 having the same height as the fins 201 being disposed in such a manner that the passages thereof are vertically oriented, and below these fins disposed at the lower end of the main partition plate 401 is a horizontal frame 603 having the same width or thickness as the height of the fins 201.

Figures 5C, 5F:
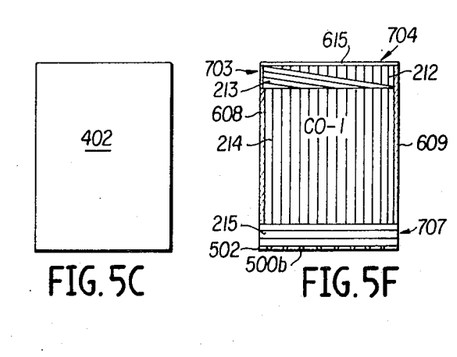
Figure 5D:
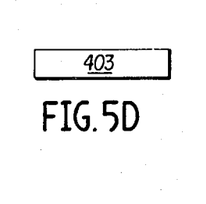
Figure 5E:
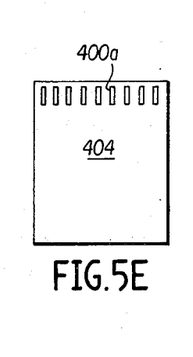
Figure 5G:
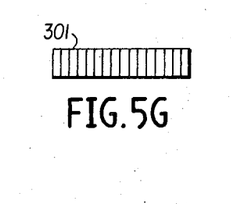
Figure 5H:
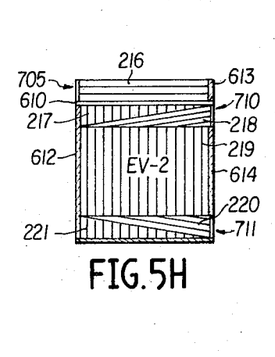
Figures 6, 7, 8A, 8B:
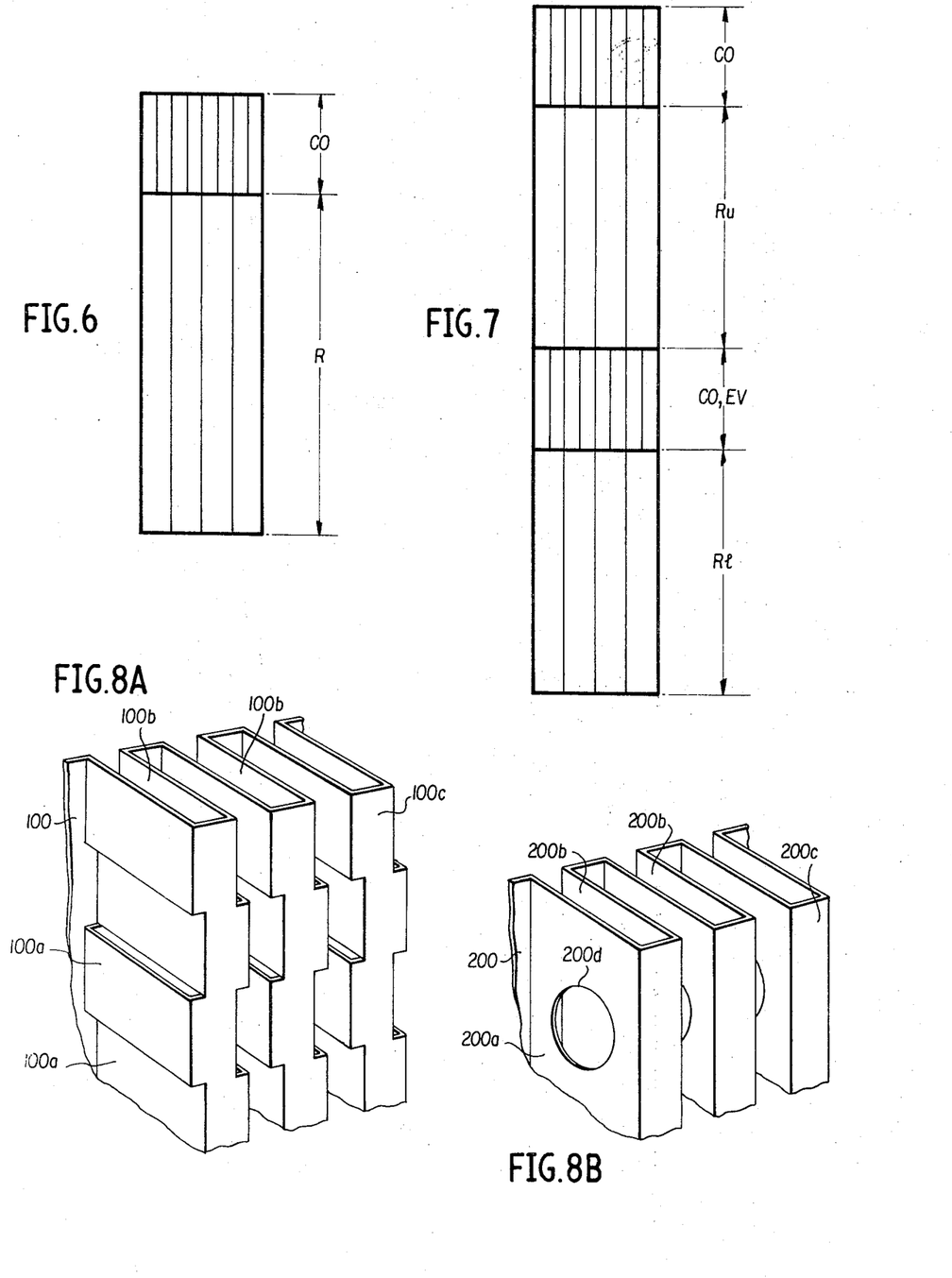
FIGS. 6 and 7 are symbolic views of other embodiments of the rectifying towers according to this invention.
FIG. 8A is an enlarged perspective view of the waved fins, or serrated fins.
FIG. 8B is an enlarged view of multi-hole plate fins, of the present invention.

Disposed at the side surfaces of the fins 103 and the liquid dispersing frame 501 is an auxiliary partition plate 403 shown in FIG. 5D. The respective frames are disposed on both sides of the respective members disposed against the main partition plates 401. That is, at one side end of each main partition plates 401 there is disposed a frame 604 having the same width as that of the frame 601 being arranged in such a manner that the ends thereof are connected to the frames 601 and 602, and a frame 605 extending from the upper end of the fins 201 to the lower end of the fins 209. The frame 605 has a portion corresponding to fins 215 and 216 through 219 cut out to be the same width as the frame 601, and a portion corresponding to the fins 103 cut out being equal in depth to the sum of the height of the fins 103 and the thickness of the auxiliary partition plate 403, and a portion corresponding to the fins 101 and 102 being the same width as the height of the fins 101 and 102. On the other side end of the main partition plate 401, a frame 606 being of the same width as the frame 601 is disposed adjacent the portion corresponding to the fins 206, and has portions corresponding to the fins 201, 203, 209 and 211 being of the same width as the frame 601, and at the portions corresponding to the fins 101, 102 and 103 there is a frame 607 being of the same width as the height of the fins 101 and disposed so as to connect to the frames 601 and 603 at both ends thereof. In FIGS. 5C and 5D, an auxiliary partition plate 402 is shown being disposed from the frame 602 to the lower end of the fins 201 on the side opposite main partition plate 401, and another auxiliary partition plate 403 is provided for positioning adjacent to the fins 103 and the liquid dispensing frame 501. An auxiliary partition plate 404, shown in FIG. 5E, is formed with a horizontal arrangement of elevationally long fine holes 400a in the upper portion thereof and is so disposed as to extend from the upper end of the fins 209 to the bottom horizontal frame 603 on the side thereof opposite main partition plate 401. In FIG. 5F, against the upper end of the partition plate 402 there is disposed a horizontal frame 615 cut out at one side end thereof, and therebelow fins 212 having the same height as that of the fins 201 are disposed in such a manner that the passages thereof are oriented vertically. Below the fins 212 are fins 213 having the same height as that of the fins 201 being oriented obliquely in a downward direction as the passages thereof become farther away from the inlet formed at one side of the auxiliary partition plate 402, and therebelow fins 214 having the same height as that of the fins 201 are disposed in such a manner that the passages thereof are oriented vertically. Under the fins 214 are fins 215, also having the same height as that of the fins 201, being disposed in such a manner that the passages thereof are oriented horizontally, and therebelow a liquid dispersing frame 502 having grooves 500b provided elevationally in the side thereof adjacent the auxiliary partition plate 402 and being of the same width as the height of the fins 201 is disposed against the lower end of the partition plate 402 similar to the liquid dispersing frame 501. At one side end of the auxiliary partition plate 402 there is disposed a frame 608 being of the same width as that of the frame 601 in such a manner that the upper end thereof is disposed against the upper end of the fins 214 and the lower end thereof is connected to the liquid dispersing frame 502. At the other side end of the auxiliary partition plate 402, a frame 609 being of the same width as that of the frame 601 is disposed in such a manner that the upper end thereof is disposed against the upper end of the auxiliary partition plate 402 and the lower end thereof is disposed against the lower end of the fins 214. Thus, the condensing fluid path CO-1 is partitioned completely from the cooling fluid path CO-2 through the provision of auxiliary partition plate 402, and the lower portion thereof is communicated with the upper rectifying portion R-1 through the grooves 500b of the liquid dispersing frame 502 while the upper portion is communicated with gas outlet 702 of the rectifying portion which is vertically higher than the liquid dispersing frame 502 at the lower portion of the frame 601 through the gas communicating pipe 23. Straight fins 301 having no holes 200d such as the multi-hole plate fins 200 are formed being the same height as the fins 201 and are disposed in such a manner that the passages thereof are vertically oriented at the auxiliary partition plate 403. The upper rectifying portion R-1 and the lower rectifying portion R-2 are directly connected through the fins 301. Disposed at the upper portion of the auxiliary partition plate 404 having the fine holes 400a are fins 216 having the same height as that of the fins 201, being arranged in such a manner that the passages thereof are horizontally oriented, and therebelow frame 610 having the same width as that of the frame 601 is disposed horizontally, so as to completely partition the fins 216 from the heating fluid path EV-2 formed thereunder. Under the frame 610 are disposed fins 217 having the same height as that of the fins 201 in such a manner that the passages thereof are oriented vertically, and therebelow the fins 218 having the same height as that of the fins 201 are disposed in such a manner that the passages thereof are obliquely oriented in a downward direction as they become farther away from the inlet formed at the other side of the auxiliary partition plate 404. Below the fins 218, fins 219 having the same height as that of the fins 201 are disposed in such a manner that the passages thereof are oriented vertically, and therebelow fins 220 having the same height as that of the fins 201 are disposed in such a manner that the passages thereof are obliquely oriented in an upward direction as they become farther away from the outlet formed at the other side of the auxiliary partition plate 404. Below the fins 220 are fins 221 having the same height as that of the fins 201 being disposed in such a manner that the passages thereof are vertically oriented, and therebelow a horizontal frame 611 having the same width as that of the frame 601 is disposed at the lower end of the auxiliary partition plate 404. Disposed at one side end of the auxiliary partition plate 404 is a frame 612 having the same width as that of the frame 601 and being connected at both ends to the frames 610 and 611. At the other side end of the auxiliary partition plate 404, a frame 613 having the same width of the frame 601 is disposed at the fin 216 portion, and at the fin 219 portion a frame 614 having the same width as that of the frame 601 is connected. Thus, the heating fluid path EV-2 is completely partitioned from the tower-bottom liquid, or reboiling liquid, path EV-1 through the auxiliary partition plate 404.

Figure 5I:
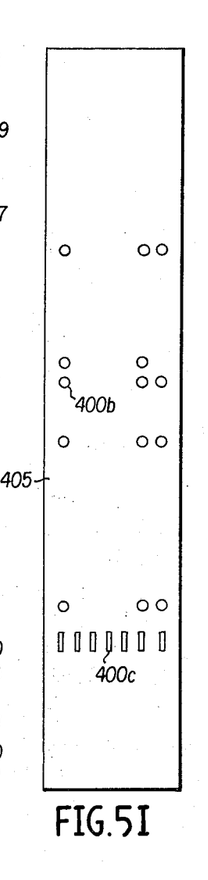
Figure 5J:
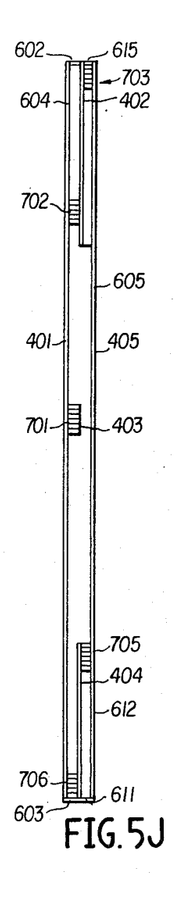

Thus, each of the rectifying elements 11 are constituted, and in order to constitute the rectifying tower body 10, the main partition plate 401 may be used as the partition plate disposed therebetween, but as shown in FIG. 5I, it is possible that the main partition plate 405 may include a plurality of holes 400b provided at positions corresponding to the upper and lower portions of the respective rectifying portions R-1 and R-2, and fine holes 400c similar to the holes 400a of the auxiliary partition plate 404 may be provided at a position corresponding to the fins 216 of the reboiling portion EV. In this case, it is preferred that the holes 400b have a diameter of two to five times the pitch width of the fins 101 and that the holes 400b have the rate of free surface rate within 20 to 50 percent. The same matter is applied for the fine holes 400c. It becomes possible to increase the uniformity of the operations of the respective condensing portion CO and the reboiling portion EV and to improve the substance moving capacity in the system by providing holes 400b and fine holes 400c in the partition plates, so that the condensed liquid component and evaporated gas component are distributed uniformly in the tower through the respective holes 400b and fine holes 400c. The rectifying elements 11 thus constructed have respective inlets and outlets at the positions of the frames as aforementioned on both side surfaces, as shown in FIG. 5J. That is, raw material supply ports 701 communicating with the raw material distributing pipes 21 are formed at the position of the fins 103, a tower-top gas outlet 702 communicates with the tower top gas manifold 22 at the position of the fins 202, a tower top gas inlet 703 communicates with the gas distributing pipes 24 at the position of the fins 213, vent ports 704 communicate with the bent manifold pipe 25 at the position of the fins 212, tower bottom outlet 705 communicates with the tower bottom liquid manifold 27 at the position of the fins 216, liquid outlets 706 communicate with the liquid manifold pipes 29 at the position of the fins 210, tower top condensing outlets 707 communicate with the tower top condensing manifold pipes 31 at the position of the fins 215, cooling liquid inlets 708 communicate with the cooling liquid distributing pipes 34 at the position of the fins 207, cooling liquid outlet 709 communicates with the cooling liquid manifold pipes 35 at the position of the fins 205, heating fluid inlet 710 communicates with the heating fluid distributing pipes 38 at the position of the fins 218, and heating fluid outlet 711 communicates with the heating fluid manifold 39 at the position of the fins 220.

According to the rectifying tower thus constructed, therefore, the raw material A is introduced for distribution into the rectifying elements 11 through the raw material supply pipes 20 and raw material distributing pipes 21. The respective raw material supply ports 701 are separated into liquid fractions and gas fractions at the portion of the fins 103, and the liquid fraction flows down through the grooves 500a of the liquid dispersing frame 501 into the lower rectifying portion R-2, while the gas fraction ascends into the upper rectifying portion R-1. The gas fraction passing through the zigzag passages of the fins 101 in the upper rectifying portion R-1 reaches the condensing portion portion CO to pass through the fins 201 and 202 to the tower top gas outlets 702. The gas fraction flowing out from the tower top gas outlets 702 is introduced through the tower top gas manifold 22, gas communicating pipes 23, gas distributing pipes 24, and tower top gas inlets 703 into the condensing fluid path CO-1. On the one hand, a cooling fluid B is introduced into the path through the cooling fluid inlet pipes 33, cooling fluid distribution pipes 34, and cooling fluid inlets 708 at the cooling fluid path CO-2 adjacent to the condensing fluid path CO-1, and after the fluid flows down this path, it flows out of the path through the cooling fluid outlets 709, cooling fluid manifold 35, cooling fluid outlet pipes 36. The part of the gas fraction flowing down in the condensing fluid path CO-1 is condensed by the cooling action of the cooling fluid B, and the rest of the gas fraction flows up through the fins 212 and vent ports 704, vent manifold pipe 25, vent pipes 26 and out of the system as the tower top gas-rectified component A1.

On the other hand, the condensed liquid reaching the fins 215 is partly taken out of the tower through the tower top condensing liquid outlet 707, tower top condensing manifold 31, and condensed liquid drain pipe 32 as the tower top condensing liquid-rectified component A2, and the rest thereof flows down in the upper rectifying portion R-1 through the grooves 500b of the liquid dispersing frames 502. The condensed liquid reaching into the upper rectifying portion R-1 flows down in a zigzag path as a thin film on the surface of the fins 101, and contacts countercurrently in the form of a wetted wall system, the gas fraction rising through the zigzag path of the fins 101, and a part thereof is again gasified to rise together with the gas fraction. In this case, since the condensed liquid and the gas fraction flowing countercurrently in contact with each other almost prevent their paths to each other for rectification by the wetted wall system on the surface of the fins 101 having broad contacting areas, the rectifying operation may be conducted without great pressure loss in comparison with the tray tower or packed tower systems. The condensed liquid flowing down at the upper rectifying portion R-1 flows down through the straight fins 301, and into the lower rectifying portion R-2 together with the liquid component flowing down through the grooves 500a of the liquid dispersing frame 501. The liquid component also flows down in a manner similar to the case of the interior of the upper rectifying portion R-1 to reach the fins 209 and 216 and then to the tower bottom liquid path EV-1.

On the one hand, the heating fluid C is introduced through the heating fluid inlet pipes 37 and heating fluid distribution pipes 38, and the respective heating fluid inlets 710 into the heating fluid paths EV-2 adjacent the tower bottom liquid paths EV-1, and after it flows down in these paths, it flows out of the system through the heating fluid outlets 711, heating fluid manifold 39, and heating fluid outlet pipes 40. The liquid fraction reaching the fins 216 is partly removed through the tower bottom outlets 705, tower bottom manifold 27, liquid communicating pipes 28 and the liquid manifold pipes 29. On the other hand, the rest of the liquid fraction joins the liquid fraction flowing down at the fins 209 through the fine holes 400a of the auxiliary partition plates 404. The liquid fraction flowing down in the tower bottom liquid path EV-1 is partly gasified through heat exchanging with the heating fluid C, and rises to the lower rectifying portion R-2 as a gas fraction so as to rectify with the liquid fraction flowing down similar to the upper rectifying portion R-1. The rest of the gas fraction remaining after the rectifying operation is further raised through the straight fins 301 to the upper rectifying portion R-1. On the other hand, the liquid fraction rectified at the lower rectifying portion R-2 reaches the tower bottom liquid path EV-1 to receive the heating action. The liquid remaining in the tower bottom liquid path EV-1 and introduced through the liquid outlets 706 to the liquid manifold pipes 29 to join the liquid flowing down at the liquid communicating pipes 28, is taken out of the tower as the tower bottom liquid rectified component A3 by the drain pipes. Thus, the fluid flowing in the rectifying elements 11 receives different rectifying actions in the upper and lower rectifying portions R-1 and R-2. Preferably, rectifying operation of the wetted wall tower is always conducted regardless of the liquid amount of the raw fluid. That is, it may be easily conducted by adjusting both or either one of the condensed liquid amounts being returned to the upper rectifying portion R-1 through the grooves 500b of the liquid dispersing frame 502 and being supplied to the fins 209 side through the fine holes 400 of the auxiliary partition plates 404.

Reference is now made to FIGS. 6 and 7, which show other embodiments of the rectifying tower of this invention wherein the same portions of the tower of these embodiments are designated by the same signs as those indicated in the previous embodiment.

In the embodiment of FIG. 6, the tower is constructed with a condensing portion CO and a rectifying portion R in which the condensing portion CO corresponds to the upper portion of rectifying elements and includes the condensers consisting of distribution chambers and heat transfer chambers and in which the rectifying portion R corresponds to the lower portion of rectifying elements and comprises the gas-liquid contacting chambers. In a rectifying element, two layers, which form the condenser, consisting of a distribution chamber and a heat transfer chamber. correspond to one layer consisting of a gas-liquid contacting chamber.

In the embodiment of FIG. 7, the tower is constructed with a condensing portion CO, an upper rectifying portion R$u$, a condensing and reboiling portion CO, EV and a lower rectifying portion R1 wherein, the condensing portion CO corresponds to the upper portion of rectifying elements and comprises the distribution chambers and the heat transfer chambers, the upper rectifying portion R$u$ corresponds to the center portion of rectifying elements and comprises the gas-liquid contacting chambers, the condensing and reboiling portion CO, EV corresponds to the center portion of rectifying elements under the upper rectifying portion R$u$ and comprises the distribution chambers which act as the heat transfer chambers for the opposite chambers in such a manner that the distribution chambers communicating with the gas-liquid contacting chambers of the upper rectifying portion R$u$ act as the cooler for the lower rectifying portion R1 and the distribution chambers communicating with the gas-liquid contacting chambers of the lower rectifying portion R1 act as the heater for the upper rectifying portion R$u$, and a lower rectifying portion R1 corresponds to the lower portion of rectifying elements and comprises the gas-liquid contacting chambers. In a rectifying element, two layers, which form the condenser at the condensing portion CO or the heat exchanger at the condensing and reboiling portion CO, EV, consisting of a distribution chamber and a heat transfer chamber, corresponds to one layer consisting of gas-liquid contacting chambers in the upper and lower rectifying portions R$u$ and R1.

As described above, the tower according to this invention has the ability to uniformly distribute a small amount of liquid over the wetted walls in the gas-liquid contacting chambers as a result of the rectifying elements being divided by both auxiliary partition plates and main partition plates which construct gas-liquid contacting chambers, distribution chambers and heat transfer chambers, and the auxiliary partition plates being located in the center portion of the gas-liquid contacting chamber over a horizontal sectional area, and in the phenomena of the rectifying elements, there is a tendency for the liquid being condensed in the distribution chamber to flow down along the auxiliary partition plates, whereby the liquid drops into the center portion of the gas-liquid contacting chamber over the horizontal sectional area.

Another advantage of this invention is the provision of effective arrangements of rectifying elements for separating a raw material into gas and liquid fractions having high quality wherein the gas outlet port in the upper portion of the gas-liquid contacting chamber is provided vertically higher than the liquid-dispersing frame at the lower portion of the heat transfer chamber and the gas outlet port communicates with the upper portion of the distribution chamber, and fine holes are provided in the auxiliary partition plate of a part projecting upwardly in a vertical direction from the uppermost portion of the heat transfer chamber.

Obviously many modifications and variations of the present invention are possible in light of the above teachings. It is to be understood therefore that within the scope of the appended claims the invention may be practiced otherwise than as specifically described herein. Accordingly,

What is claimed as new and desired to be secured by Letters Patent of the United States is:

1. A rectifying tower having a laminate of rectifying elements filled with waved fins between vertical main partition plates in which each rectifying element comprises:

at least one auxiliary partition plate having a smaller area than that of said main partition plates and disposed vertically between two opposing parallel main partition plates;

a gas-liquid contacting chamber composed of a space formed between adjacent surface areas of two opposing main partition plates not having said auxiliary partition plate disposed therebetween;

a distribution chamber composed of a space formed between said at least one auxiliary partition plate and one of said two main partition plates, and a heat transfer chamber composed of a space formed between said at least one auxiliary partition plate and the other of said two main partition plates having passage sealed from said gas-liquid contacting chamber and said distribution chamber.

2. A rectifying tower as set forth in claim 1, wherein said at least one auxiliary partition plate is disposed in the upper portion of said main partition plates in vertical orientation so that said distribution chamber is a liquid distribution chamber, and the path of said heat transfer chamber is a cooling fluid passage.

3. A rectifying tower as set forth in claim 2, wherein a horizontal liquid-dispersing frame forming a boundary between said liquid distribution chamber and said gas-liquid contacting chamber is disposed adjacent the lowermost portion of said at least one auxiliary partition plate and said frame provides at least one groove for flowing liquid downward at the end of said at least one auxiliary partition plate along a side of said liquid-dispersing frame.

4. A rectifying tower as set forth in claim 3, wherein the lowermost surface of said heat transfer chamber is disposed vertically higher than the lowermost portion of said at least one auxiliary partition plate, and a gas outlet port communicating with said gas-liquid contacting chamber is disposed vertically higher than the lowermost portion of said at least one auxiliary partition plate at the lower portion of the heat transfer chamber.

5. A rectifying tower as set forth in claim 4, further comprising
a path for communicating the gas flow outlet of the lower portion of said heat transfer chamber with the upper portion of said liquid distribution chamber.

6. A rectifying tower as set forth in claim 2, wherein the lowermost surface of said heat transfer chamber is disposed vertically higher than the lowermost portion of said at least one auxiliary partition plate, and a gas outlet port communicating with said gas-liquid contacting chamber is disposed vertically higher than the lowermost portion of said at least one auxiliary partition plate at the lower portion of the heat transfer chamber.

7. A rectifying tower as set forth in claim 6, further comprising:
a path for communicating the gas flow outlet of the lower portion of said heat transfer chamber with the upper portion of said liquid distribution chamber.

8. A rectifying tower as set forth in claim 2, wherein said at least one auxiliary partition plate is disposed in the lower portion of said main partition plates in a vertical orientation so that said distribution chamber is a gas distribution chamber, and the path of said heat transfer chamber is a heating liquid passage, and further comprising a horizontal liquid-dispersing frame forming a boundary between said liquid distribution chamber and said gas-liquid contacting chamber being disposed adjacent the lowermost portion of said at least one auxiliary partition plate, and said frame provides at least one groove for flowing liquid downward at the end of said at least one auxiliary partition plate along a side of said liquid-dispersing frame.

9. A rectifying tower as set forth in claim 1, wherein said at least one auxiliary partition plate is disposed in the lower portion of said main partition plates in vertical orientation so that said distribution chamber is a gas distribution chamber, and the path of said heat transfer chamber is a heating liquid passage.

10. A rectifying tower as set forth in claim 9, wherein the uppermost surface of said heat transfer chamber is vertically disposed lower than the uppermost portion of said at least one auxiliary partition plate.

11. A rectifying tower as set forth in claim 10, wherein said at least one auxiliary partition plate has a plurality of fine holes in the part projecting upwardly in vertical direction from the uppermost portion of said heat transfer chamber.

12. A rectifying tower as set forth in claim 1, wherein said auxiliary partition plate is disposed in the upper portion of said main partition plates in vertical orientation so that said distribution chamber is a liquid distribution chamber, and the path of said heat transfer chamber is a cooling fluid passage, said at least one auxiliary partition plate is disposed in the lower portion of said main partition plates in a vertical orientation so that said distribution chamber is a gas distribution chamber, and the path of said heat transfer chamber is a heating liquid passage.

13. A rectifying tower as set forth in claim 1, wherein said vertical main partition plates dividing respective rectifying elements have holes adjacent the position corresponding to said gas-liquid contacting chamber.

14. A rectifying tower as set forth in claim 13, wherein said holes have diameters of two to five times the pitch width of said fins in the gas-liquid contacting chamber and occupy an area equal to about 20 to 50 percent of the area of the surface of said vertical main partition plates corresponding to said gas-liquid contacting chamber.

15. A rectifying tower as set forth in claim 1, wherein said fins are serrated with the heights of the raised portions being 8 to 20mm and the wave pitch thereof being 1.5 to 6mm in said gas-liquid contacting chamber.

* * * * *